Figure 1:
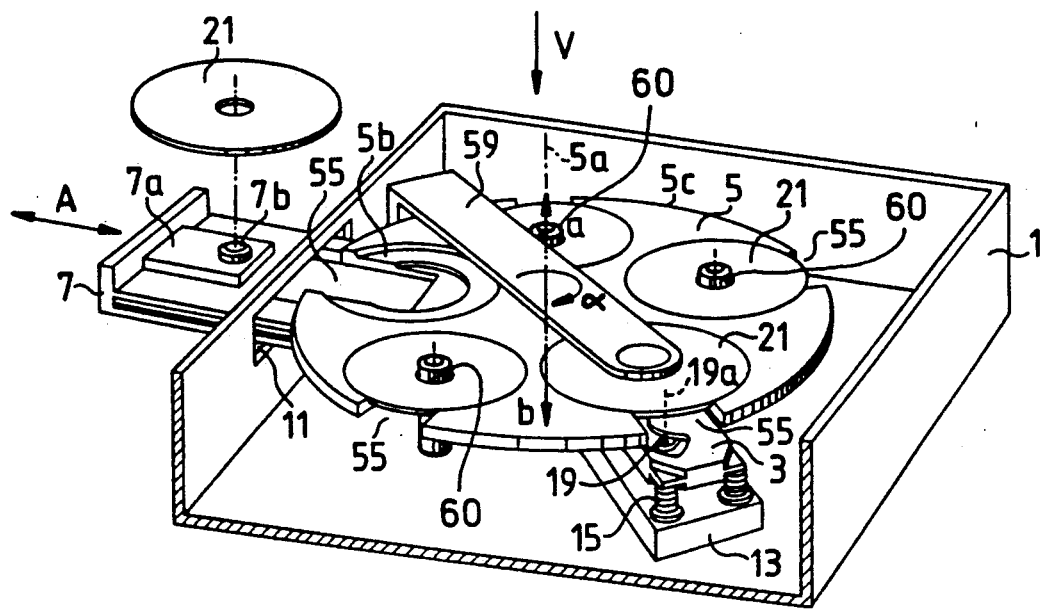

United States Patent [19]

Van Heusden et al.

[11] Patent Number: 5,197,056

[45] Date of Patent: Mar. 23, 1993

[54] DISC RECORD PLAYER

[75] Inventors: Omar P. L. P. Van Heusden; Jozef H. M. R. Verheyen, both of Hasselt, Belgium

[73] Assignee: U.S. Philips Corporation, New York, N.Y.

[21] Appl. No.: 794,345

[22] Filed: Nov. 12, 1991

Related U.S. Application Data

[63] Continuation of Ser. No. 547,744, Jul. 3, 1990, abandoned.

[30] Foreign Application Priority Data

Jul. 4, 1989 [NL] Netherlands ................. 8901699

[51] Int. Cl.[5] .................. G11B 25/04; G11B 17/22
[52] U.S. Cl. .................. 369/37; 369/75.2; 369/77.1; 369/191
[58] Field of Search .......... 369/36, 37, 38, 75.2, 369/77.1, 39, 191, 194, 258, 75.1

[56] References Cited

U.S. PATENT DOCUMENTS

| | | | |
|---|---|---|---|
| 4,410,971 | 10/1983 | Eisemann | 369/75.2 |
| 4,527,264 | 7/1985 | d'Alayer de Costemore | 369/77.1 |
| 4,566,087 | 1/1986 | Kraft | 369/37 |
| 4,607,361 | 8/1986 | Schuitmaker et al. | 369/77.1 |
| 4,670,866 | 6/1987 | Hasegawa et al. | 369/194 |
| 4,680,748 | 7/1987 | Kobayashi | 369/77.1 |
| 4,755,978 | 7/1988 | Takizawa et al. | 369/37 |
| 4,901,172 | 2/1990 | Nakazawa et al. | 369/37 X |

FOREIGN PATENT DOCUMENTS 63-266683  11/1988  Japan ................. 369/258

Primary Examiner—Stuart S. Levy
Assistant Examiner—Joseph A. Rhoa
Attorney, Agent, or Firm—David R. Treacy

[57] ABSTRACT

A disc-record player includes a lazy Susan type changer mechanism (5) arranged within a housing, a drawer (7) movable through an opening in the housing, and having a supporting surface for moving information discs into and out of the housing for loading and unloading from the changer; a scanning device (3) for writing and/or reading information discs which have been transferred from a supporting surface on the changer to a turntable (17) of the scanning device; and mechanisms for rotating the lazy Susan and moving the scanning device relative to the lazy Susan for picking up a disc placed on the lazy Susan, and moving it into a scanning position. A positioning device has a drive unit for positioning the scanning device and lazy Susan relative to each other. The scanning device is moved to transfer a disc to the scanning position responsive to rotation of the lazy Susan.

25 Claims, 4 Drawing Sheets

DISC RECORD PLAYER

This is a continuation of application Ser. No. 07/547,744, filed Jul. 3, 1990, now abandoned.

The invention relates to a disc-record player comprising a housing and a stationary frame accommodated in the housing, a scanning device for inscribing and/or reading information discs, in particular optical or magneto-optical discs, which device comprises a turntable which is rotatable about an axis of rotation and which has a supporting surface for supporting an information disc which is in a scanning position, a "lazy Susan" type disc changer including a disc support which is rotatable about an axis of rotation and which has a plurality of supporting surfaces adapted to support an information disc, a loading device comprising a drawer which is movable through an opening in the housing and which comprises a supporting surface for moving information discs into and out of the housing, a positioning device comprising an electrical drive unit for positioning the scanning device and the disc support relative to one another for the purpose of bringing information discs into the scanning position.

German Offenlegungsschrift DE 37 05 007 (herewith incorporated by reference) discloses a disc-record player comprising a sliding table which is horizontally slidable into and out of a housing, a disc support having a plurality of supporting surfaces being rotatably supported in said table. The sliding table has a drive arrangement for rotating and positioning the disc support. The housing accommodates a scanning device with a turntable for scanning an optical disc. The known disc-record player further comprises a loading device for moving the sliding table and the disc support into and out of the housing. If the slid-in disc support is in a desired playing position the optical scanning device can be moved in a vertical direction, the disc to be scanned being lifted off the disc support by the turntable and being clamped between the turntable and a disc-pressure device. The sliding table cannot be moved while a disc is being scanned.

A disadvantage of the known disc-record player is inter alia that the sliding table has comparatively large dimensions, the housing being necessarily formed with a large front opening for the passage of the sliding table. Another disadvantage of the known disc-record player is that while an optical disc is scanned the other discs cannot be changed.

It is an object of the invention to modify the disc-record player defined in the opening paragraph in such a way that only a small movable drawer is required for moving a plurality of information discs into and out of the housing and to provide a possibility of changing one or more information discs while an information disc is being scanned.

To this end the disc-record player in accordance with the invention is characterized in that the disc support is supported in the stationary frame and so as to remain permanently inside the housing, the supporting surfaces of the disc support and the supporting surface of the drawer being movable relative to each other in a direction parallel to the axis of rotation of the disc support in a slid-in position of the drawer. In the disc-record player in accordance with the invention the disc support is therefore rotatable about an axis of rotation which is in a fixed relationship to the stationary frame. Consequently, a drawer of simple construction can be used for moving the information discs into and out of the housing. The use of separate constructions for the drawer and the disc support enables at least one information disc to be loaded into and/or unloaded from the housing while another information disc is being scanned. A further advantage of the disc-record player in accordance with the invention is that the disc support, which is rotatable about a fixed axis of rotation, can be mechanically positioned in a comparatively simple manner.

An embodiment of the disc-record player in accordance with the invention is characterized in that the disc support is movable along its axis of rotation between a first plane in which, viewed along the axis of rotation and towards the supporting surfaces of the disc support, the supporting surfaces of the disc support are situated behind the supporting surface of the drawer, and a second plane in which, viewed in the same direction, the supporting surfaces of the disc support are situated before the supporting surface of the drawer. By moving the disc support along its axis of rotation an information disc on the supporting surface of the slid-in drawer can be transferred simply to one of the supporting surfaces of the disc support. In this way it is also possible to transfer an information disc from one of the supporting surfaces of the disc support to the supporting surface of the drawer.

Another embodiment of the disc-record player in accordance with the invention is characterized in that the disc support is movable along its axis of rotation between a third plane in which, viewed along the axis of rotation and towards the supporting surfaces of the disc support, the supporting surfaces of the disc support are situated before the supporting surface of the turntable, and a fourth plane in which, viewed in the same direction, the supporting surfaces of the disc support are situated behind the supporting surface of the turntable. By moving the disc support along its axis of rotation an information disc can be placed onto or removed from the turntable.

It is obvious that during the cooperation of the disc support with the drawer and during the cooperation of the disc support with the turntable one of the supporting surfaces of the disc support should be in a correct position relative to the supporting surface of the drawer and the supporting surface of the turntable respectively.

In a practical embodiment the first and the fourth plane and the second and the third plane will coincide.

A further embodiment is characterized in that there is provided a lifting mechanism which is constructed to be driven by the electrical unit of the positioning device, for moving the disc support relative to the frame parallel to its axis of rotation. Preferably, this embodiment is further characterized in that in a first direction of rotation of the electrical unit the disc support is movable in a first direction parallel to its axis of rotation and in a first direction of rotation, and in a second direction of rotation of the electrical unit the disc support is movable in a second direction parallel to its axis of rotation. This enables a simple yet efficient positioning device to be obtained, by means of which an information disc on the disc support can be transferred rapidly and effectively towards the turntable or the drawer.

An embodiment of the disc-record player in accordance with the invention, in which the turntable is movable along its axis of rotation between a first position in which, viewed along the axis of rotation and towards of the supporting surface of the turntable, the supporting surface of the turntable is situated behind the supporting surfaces of the disc support, and a second position in which, viewed in the same direction, the supporting surface of the turntable is situated before the supporting surfaces, is characterized in that the drawer of the loading device comprises a tray which is provided with the supporting surface of the drawer and which is movable at least in a direction transverse to the supporting surface of the drawer, the tray occupying a first position in a slid-out position of the drawer in which first position, viewed along the axis of rotation of the turntable and towards the supporting surfaces of the disc support, the supporting surface of the drawer is disposed in a plane situated before the supporting surfaces of the disc support and the tray occupying a second position in the slid-in position of the drawer in which second position, viewed along the axis of rotation of the disc-support and towards the supporting surfaces of the disc support, the supporting surface of the drawer is disposed in a plane situated behind the supporting surfaces of the disc support. In this embodiment the disc support need not be arranged to be movable along its axis of rotation. By means of a suitable construction for guiding the drawer and its tray an information disc can be placed on or removed from one of the supporting surfaces of the disc support during the movement of the drawer.

A further embodiment, in which the disc support is not movable along its axis of rotation, is characterized in that the turntable of the scanning device is arranged on a subframe, which is pivotable relative to the frame about a pivotal axis which extends parallel to the axis of rotation of the turntable or which coincides with said axis of rotation in order to move the turntable between the first and the second position. This enables the disc support and the scanning device to be constructed as a compact assembly.

An embodiment which enables information discs on the turntable to be changed rapidly is characterized in that the subframe is coupled to the disc support by means of a unidirectional coupling, the disc support in a first direction of rotation of the electrical unit of the positioning device being movable in a first direction of rotation while the turntable is held in position and the disc support together with the turntable in a second direction of rotation of the electrical unit being movable in a second direction of rotation, the turntable also being movable in a direction parallel to the axis of rotation.

An embodiment which enables a plurality of information discs to be changed during scanning of another information disc is characterized in that the turntable of the scanning device is arranged on a movable subframe, which subframe is movable relative to the fixed axis of rotation of the disc support. Preferably, the subframe is secured to a slide which is supported in the frame and which is movable in a radial direction relative to the fixed axis of rotation of the turntable.

An embodiment, in which two information discs can be scanned after one another substantially without any interruption, is characterized in that there is provided a further turntable which is rotatable about a further axis of rotation and which is arranged on a further slide, both slides being movable relative to the disc support and relative to one another to bring information discs in the scanning position.

Figure 2:
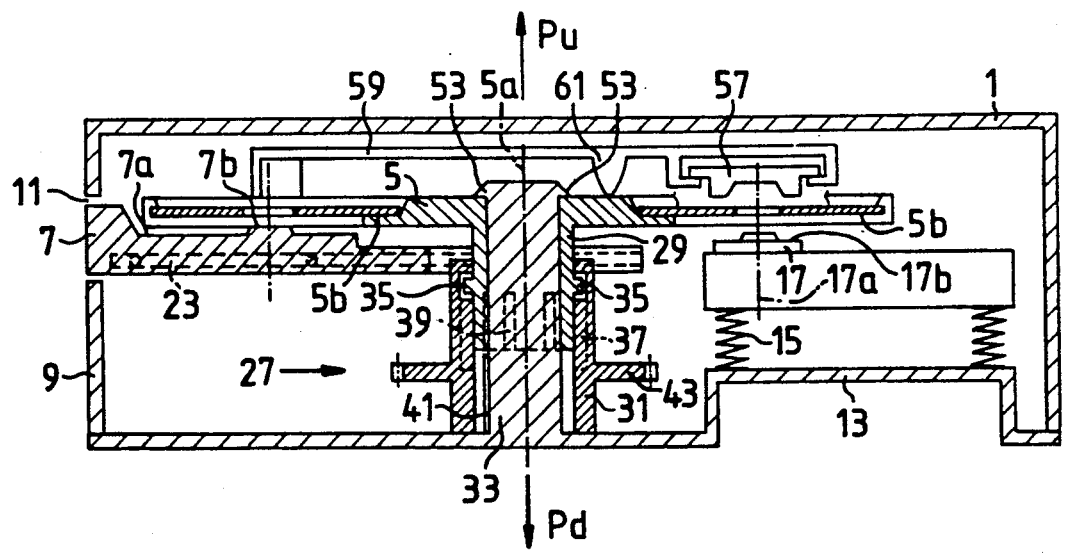
Figure 3:
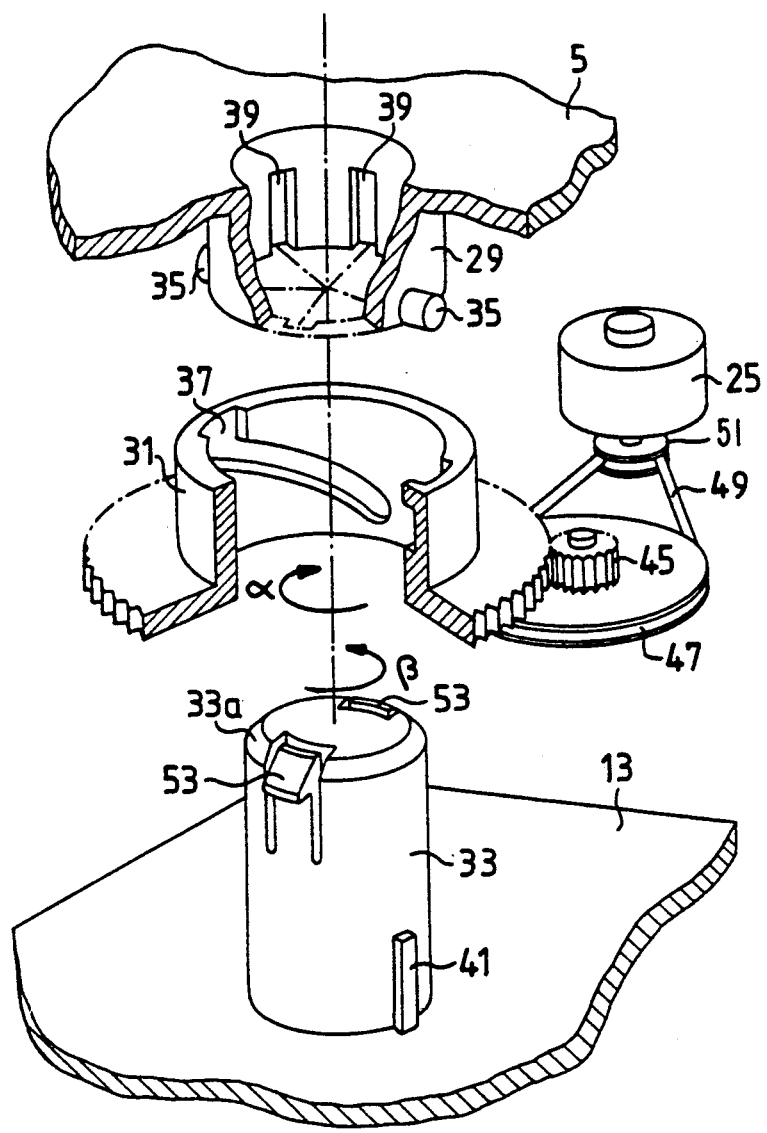
Figure 4:
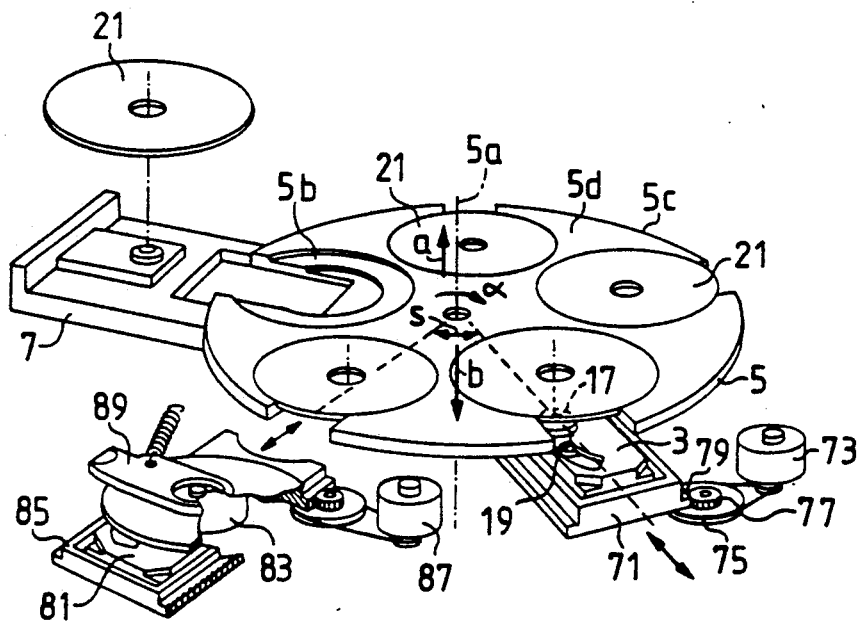
Figure 5:
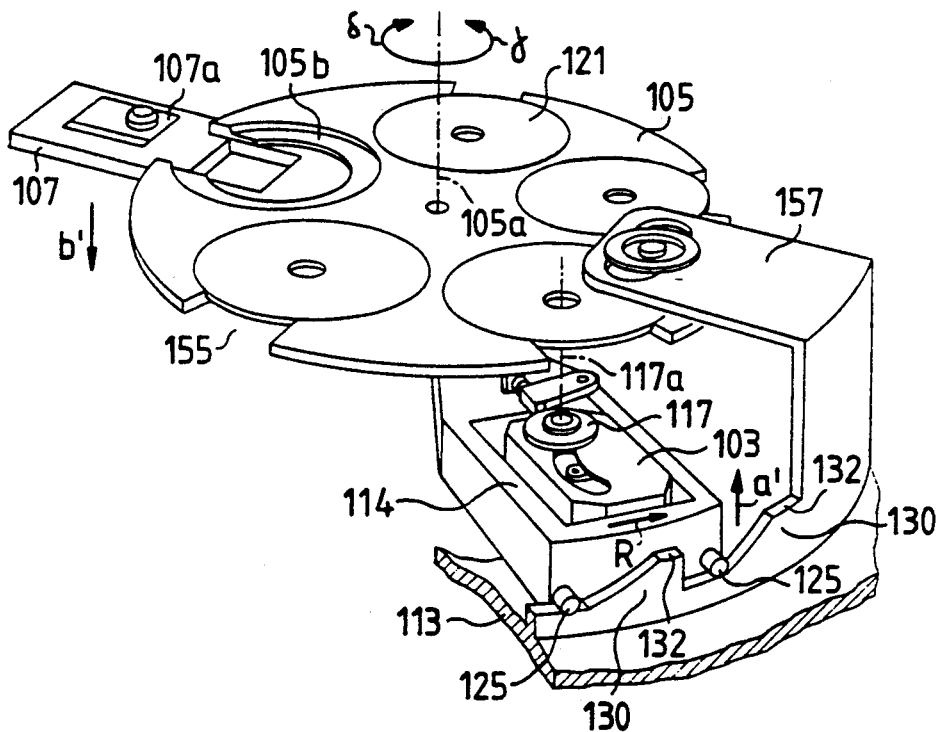
Figure 6:
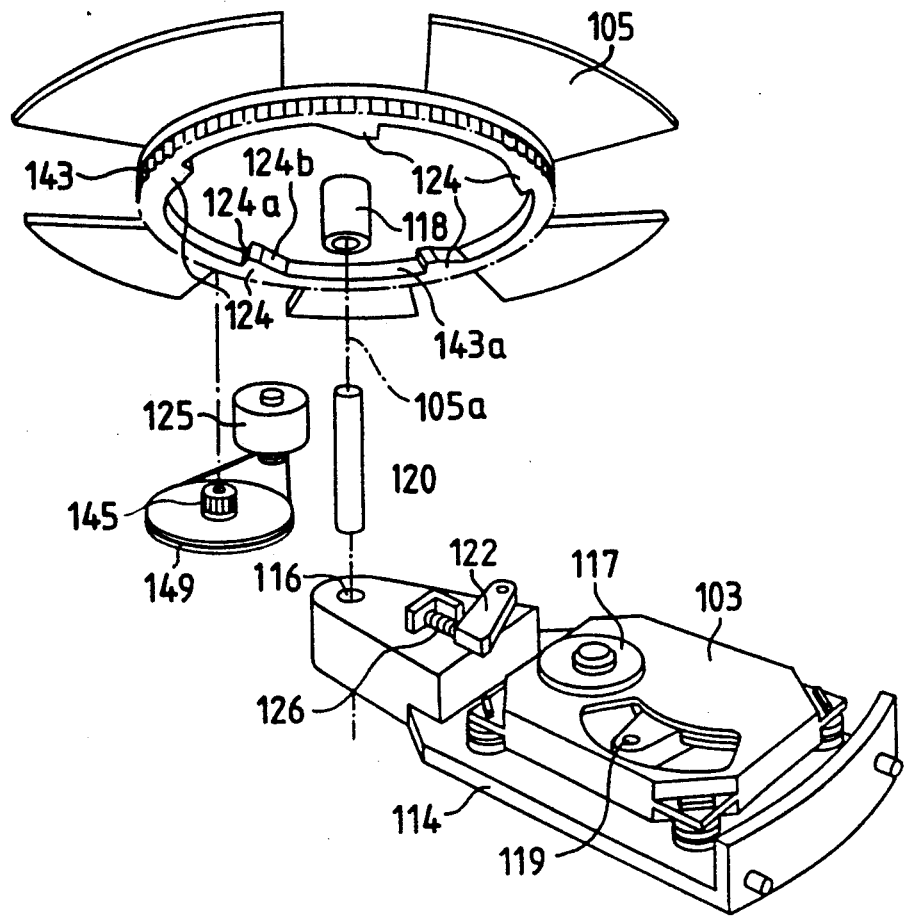
Figure 7A:
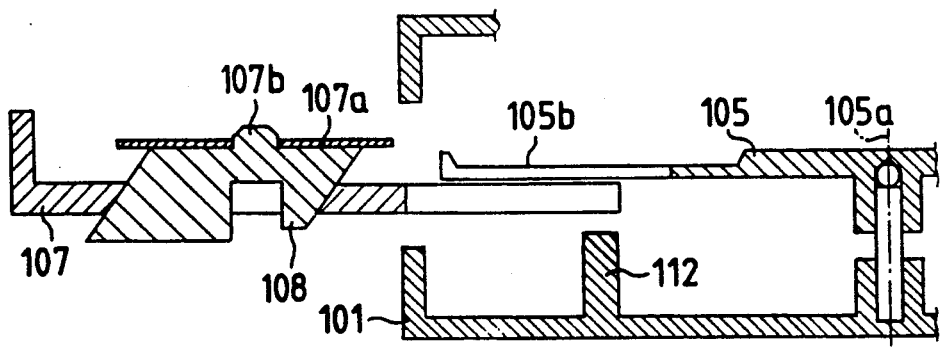
Figure 7B:
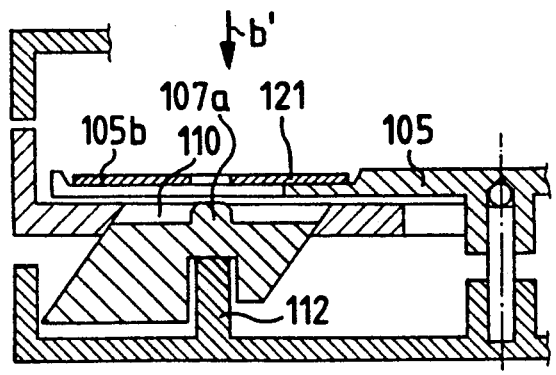

An embodiment of the invention will now be described in more detail, by way of example, with reference to the drawings in which FIG. 1 is a diagrammatic perspective view of a part of a first embodiment of the disc-record player in accordance with the invention, FIG. 2 is a sectional view of the first embodiment, FIG. 3 is an exploded view of a constructional part of the embodiment shown in FIG. 1, FIG. 4 is a diagrammatic perspective view of a second embodiment of the disc-record player in accordance with the invention, FIG. 5 is a diagrammatic and perspective view of a third embodiment of the disc-record player in accordance with the invention, FIG. 6 is an exploded view of a constructional part of the embodiment shown in FIG. 5, FIG. 7A is a sectional view of a second constructional part of the embodiment shown in FIG. 5, the drawer being shown in a slid-out position, and FIG. 7B is a sectional view of the second constructional part of the embodiment shown in FIG. 5, the drawer being shown in a slid-in position.

The disc-record player in accordance with the invention shown in FIGS. 1, 2 and 3, which can be manufactured readily, comprises a housing 1, a scanning device 3, a disc support 5 and a loading device comprising a drawer 7. The housing 1, has a slot-shaped loading aperture 11, at a front side 9 accommodates a stationary frame 13, which in the present example also constitutes the bottom of the housing. The scanning device 3 is supported on the frame 13 by means of suitable resilient and damping means 15 and may be of a type as shown and described in U.S. Pat. No. 4,679,185. The scanning device 3 comprises a turntable 17 and an optical scanning unit 19. The turntable 17 is rotatable about an axis of rotation 17a and comprises a supporting surface 17b for supporting an optical disc 21. The optical scanning unit 19 forms part of a pivotal-arm device and comprises a lens system which is movable along an optical axis 19a.

The drawer 7 can be moved rectilinearly into and out of the housing 1 as is indicated by the double arrow A, for which purpose a rectilinear guidance construction 23 known per se, may be employed. The drawer 7 has a supporting surface 7a and a centering projection 7b to ensure a well-defined positioning of an optical disc 21.

The disc support 5 is disc-shaped, is rotatable about an axis of rotation 5a and is translatable relative to the frame 13 along the axis of rotation 5a. For the rotational and translational movements of the disc support 5 the disc-record player is provided with a positioning device comprising an electrical drive unit 25 and a lifting mechanism 27. The lifting mechanism 27 comprises two coaxial parts, of which first part 29 is constructed as a hub and is integral with the disc support 5 and of which a second part 31 is constructed as a sleeve which is mounted for rotation about a spindle 33 secured to the frame 13. The hub 29 comprises two radially projecting oppositely directed pins 35, which engage in a spiral groove 37 in the sleeve 31. On its inner side the hub 29 is formed with axial slots 39 for cooperation with a positioning projection 41 arranged on the circumference of the spindle 33. The sleeve 31 is provided with a gear ring 43 which is in mesh with a pinion 45 of a transmission mechanism. The pinion 45 is mounted on a pulley 47, which is coupled to a pulley 51 of the electrical drive unit 25 by a belt 49. Near its free end 33a the fixed spindle 33 has two resilient latching stops 53 which limit the axial movement of the disc support 5 in an upward direction, indicated by the arrow Pu in FIG. 2.

In the present embodiment the disc support 5 comprises five supporting surfaces 5b disposed in one plane, so that a maximum of 5 discs 21 can placed on the disc support 5. At the location of the supporting surfaces 5b the disc support 5 is formed with recesses 55 which extend radially of the axis of rotation 5a and which in the present example extend up to the periphery 5c of the disc support 5.

The disc-record player in accordance with the invention further comprises a disc-pressure member 57 for clamping an optical disc 21 onto the turntable 17 during scanning. The disc-pressure member 57 is secured to a hingable supporting arm 59, which can bear on the disc support 5 with a follower 61.

The following is to be noted with respect to the operation of the disc-record player shown in FIGS. 1, 2 and 3. In FIG. 1 the drawer 7 is in a partly slid-in position, in which the supporting surfaces 5b of the disc support 5 are disposed in a first plane. Viewed along the axis of rotation 5a and towards the supporting surface 5b. i.e. viewed in the direction indicated by the arrow V in FIG. 1 this plane is situated behind the supporting surface 7a of the drawer 7. The disc support 5 is then oriented in such a way relative to the drawer 7 that one of the supporting surfaces 5b is situated exactly underneath the path of movement of the supporting surface 7a. In this position of the disc support 5 the projection 41 engages one of the slots 39.

After the drawer has been slid completely into the housing 1 by hand or by means of an electric motor, the drawer then occupying a position as shown in FIG. 2, the electrical drive unit 25 can be energized to move the disc support 5. For this purpose the electrical unit 25 is started in a specific first direction of rotation, the sleeve 31 being driven in such a way that the disc support 5 is moved in the upward direction a parallel to its axis of rotation, causing the projection 41 to be disengaged from the slot 39. As the energization of the electrical unit 25 continues, the sleeve 31 and the disc support 5 are rotated in a direction of rotation $\alpha$. During the vertical displacement a the disc 21 on the drawer is carried along by one of the supporting surfaces 5b of the disc support. At the end of said vertical movement the disc support occupies a position as illustrated in FIG. 2.

With the aid of a programming unit, not shown, of the disc-record player a user can indicate which discs 21 or which parts thereof have to be scanned. By means of a microprocessor this information can be transferred to a positioning device by means of which the electrical drive unit 25 can be controlled. The electrical unit 25 is then energized until, as a result of the rotation $\alpha$ of the disc support 5, a selected disc is situated at the correct location above the turntable 17. Subsequently, the electrical unit 25 is energized in such a way that it starts in the opposite direction, causing the sleeve 31 to be rotated in a direction $\beta$ and the disc support to be moved in a downward direction b parallel to its axis of rotation, rotation of the disc player being inhibited by appropriate means, so that the supporting surfaces 5b are disposed behind the supporting surface 17b of the turntable 17 viewed in the direction indicated by the arrow V. During this downward movement an optical disc 21 is placed on the turntable and is clamped onto this turntable by the pressure member 57. Subsequently, the disc 21 thus loaded can be scanned.

The supporting surfaces 5b are arranged on the disc support 5 in such a way that in the scanning position of a disc 21 one of the supporting surfaces 5b is situated in such way relative to the drawer 7 that a disc can be moved in or moved out by moving said drawer outwards or inwards respectively. In other words, as an optical disc is being scanned it is possible to replace another disc. If another disc is to be scanned or changed the disc support 5 is successively moved in the upward direction a, in the direction of rotation $\alpha$ and in the downward direction b by an appropriate energisation of the electrical unit 25.

The disc-record player comprises three safety pins 60 which are secured to the frame 13 and which each have a free end disposed in the same plane as the free end of the centering pin 7b for the drawer 7. The pins 60 serve to preclude lateral displacements of the discs situated on the disc support 5 in the case that the housing 1 is tilted.

The second embodiment of the disc-record player in accordance with the invention shown diagrammatically and partly in FIG. 4 bears much resemblance to the disc-record player described above. Therefore, corresponding parts bear the same reference numerals. The disc-record player comprises a disc support 5 which is movable along an axis of rotation 5a and which is rotatable about the axis of rotation 5a, which support has five supporting surfaces 5b. The supporting surfaces 5b, which are slightly recessed relative to the upper surface 5d, are adapted to support optical or magneto-optical discs 21, for example Compact Discs or CD-singles. To support both large and small discs the supporting surfaces may be stepped, in such a way that these supporting surfaces have parts disposed in a first plane and parts disposed in a second plane. The disc-record player further comprises a loading device with a drawer 7 and an optical scanning device 3 comprising a turntable and a scanning unit 19. The loading device and the scanning device may be similar to the loading device and the scanning device of the disc-record player shown in FIG. 1. The disc-record player shown in FIG. 4 also comprises a lifting mechanism and a positioning device, similar to the lifting mechanism 27 and the positioning device of the disc-record player shown in FIG. 1.

The scanning device 3 of the disc-record player shown in FIG. 4 is arranged on a subframe constructed as a slide 71. The slide 71 is supported in the frame of the disc-record player and is movable radially of the axis of rotation 5a between the position shown, in which a disc 21 can be placed on the turntable 17 by a downward movement b of the disc support 5, and a position outside the circumference 5c of the disc support 5. For a linear drive of the slide 71 there is provided an electric motor 73 and a transmission mechanism 75, the transmission mechanism 75 comprising a pinion 77 adapted to mesh with a gearrack 79 of the slide 71. During scanning of an optical disc 21 the slide 71 enables the disc support 5 to be rotated (direction $\alpha$) and to be translated (directions a and b). This enables a maximum of four optical discs to be changed during scanning, the positioning device obviously comprising suitable electronic control means.

If desired, the disc-record player shown in FIG. 1 may comprise a further scanning device 81 and a further turntable 83, which are both arranged on a further slide 85. The slide 85 can perform a linear movement corresponding to the movement of the slide 71 and is driven by an electric motor 87. In the present example, the angle S between the two radial paths is 72°, which corresponds to 360° divided by the number of supporting surfaces 5b of the disc support 5. By means of such an embodiment it is possible, while an optical disc 21 is scanned for example by means of the scanning unit 3, to place another optical disc 21 on the turntable of the other optical device and to bring it in the scanning position. This has the advantage that the discs can be scanned after one another substantially without a break.

It is to be noted that in the embodiment shown in FIG. 4 each scanning device comprises a separate disc-pressure device 89 for pressing an optical disc onto the turntable.

The embodiment of the disc-record player in accordance with the invention shown diagrammatically in FIGS. 5, 6, 7A and 7B comprises a disc support 105 which is mounted for rotation relative to a stationary frame 113. The disc support 105 which is rotatable about an axis of rotation 105a, comprises five recessed supporting surfaces 105b disposed in recesses for receiving optical discs 121. On its underside the disc support 105 carries a gear ring 143, which is in mesh with a pinion 145 of a transmission mechanism 149. An electric drive unit 125 is coupled to the transmission mechanism to provide the rotation of the disc support 105. The disc-record player further comprises a loading device having a drawer 107, comprising a supporting surface 107a on which an optical disc 121 can be placed. The drawer 107 is rectilinearly movable relative to the housing 101 of the disc-record player between a slid-out position, as shown in FIG. 7A, and a slid-in position, as shown in FIG. 7B. The supporting surface 107a is constituted by a movable tray 108 arranged in an opening 110 in the drawer 107. At its upper side the tray 108 carries a centering projection 107b to ensure that an optical disc is centered on the supporting surface. As the drawer 107 moves inwards into the housing 101 so that, obviously, one of the supporting surfaces 105b of the disc support 105 and the supporting surface 107a of the drawer 107 are radially aligned, the tray 108 will abut against the stop 112, causing the tray to be moved in a downward direction (b') until the drawer 107 occupies the position shown in FIG. 7B, in which an optical disc 121 is situated on a supporting surface 105b of the disc support 105 and the supporting surface extends in a plane beneath the supporting surfaces 105b. A disc 121 thus loaded onto the disc support 105 can be moved towards the scanning device 103 by a suitable rotation (δ) of the disc support.

The scanning device 103 comprises a turntable 117, which is rotatable about an axis of rotation 117a, and an objective 119. The scanning device 103 is secured to a subframe 114, which is movable relative to the stationary frame 113. The subframe 114 is pivotable about the axis 105a and for this purpose it has an opening 116 which is engaged by a bearing pin 120 which is secured in the frame 113 and which cooperates with a bearing sleeve 118. On the subframe 114 a coupling pawl 122 is arranged to form a unidirectional coupling in conjunction with five projections 124 of the disc support 105. For this purpose the projections 124, which are arranged on the innerside of the gear ring 143, each comprise a stop surface 124a and an inclined surface 124b. A spring 126 ensures that the pawl 122 is urged against the inner side 143a with a specific force. The subframe 114 further comprises pins 125 which project radially outwards for cooperation with run-on surfaces 130 of the frame 113. When the disc support 105 is rotated in the direction one of the stop surfaces 124a of the projections 124 abuts against the pawl 122, causing the subframe 114 to perform a pivotal movement as indicated by the arrow R. The pins 125 then slide over the run-on cams 130, causing the subframe 114 to be moved in an upward direction (a') as it slides along the bearing pin 120. These parts are dimensioned and positioned in such a way relative to one another that at the end of said pivotal movement, when the pins 125 are situated on the edges 132 of the projections 130, the scanning device 103 is situated in a recess 155 at the location of a supporting surface 105b. In the last-mentioned position an optical disc 121 situated on the turntable 107 is in the position for scanning. A disc-pressure device 157 ensures that the optical disc is pressed against the turntable 117.

To move an optical disc towards the scanning device 103 or towards the loading device the disc support 105 is rotated in a direction δ, the subframe 114 being brought in the position shown in FIG. 5 and the pawl 122 moving along the run-on surfaces 124b.

Obviously, the invention is not limited to the embodiments disclosed herein. Other embodiments, in which for example the disc support comprises a larger or smaller number of supporting surfaces, fall within the scope of the invention. Moreover, when one or more slides are employed it is possible to bring the scanning devices outside the range of the disc support by movements parallel to the axis of rotation of the disc support.

r

We claim:
1. A disc-record player comprising:
a housing, and a stationary frame accommodated in said housing,
a scanning device for scanning a positioned information disc which is in a scanning position in said housing, said device comprising a turntable which is rotatable about a turntable axis and which has a supporting surface for supporting said positioned information disc in said scanning position,
a disc support which has a plurality of supporting surfaces spaced around a support axis, adapted to support a corresponding plurality of information discs,
means for mounting said disc support for rotation about said support axis in said stationary frame, and for retaining said disc support permanently inside said housing,
a loading device, comprising: a drawer which is movable through an opening in the housing, and has a supporting surface for moving information discs into and out of the housing; and loading means for moving the respective supporting surfaces of the disc support and the drawer relative to each other in a direction parallel to said support axis, and
a positioning device comprising a movable drive member for positioning the scanning device and the disc support relative to one another about said support axis, to bring a selected information disc into said scanning position, relative rotation of said disc support being responsive to movement of said member in at least a given direction,
characterized in that the positioning device comprises a lifting mechanism for moving the disc support and the scanning device relative to one another parallel to said support axis, between a first scanning device position in which the disc support can be rotated by said positioning device free from interference with said scanning device, and a sec- ond scanning device position in which an information disc can be transferred between the supporting surface of the turntable and one of said supporting surfaces of the disc support, movement of said member in at least one direction causing relative movement from said second to said first scanning device positions.

2. A player as claimed in claim 1, characterized in that said at least one direction of member movement is said given direction.

3. A player as claimed in claim 1, characterized in that the drawer of the loading device comprises a tray which is provided with the supporting surface of the drawer, and said loading means comprises means for moving said tray at least in a direction transverse to the supporting surface of the drawer between a first tray position when the surface of the drawer is in a slid-out position, and a second tray position when the drawer is in a slid-in position; in said first tray position the supporting surface of the drawer being disposed in a plane above the supporting surfaces of the disc support; and in said second tray position the supporting surface of the drawer being disposed in a plane below the supporting surfaces of the disc support.

4. A player as claimed in claim 3, characterized in that said disc support has a respective recess extending radially from the periphery of the disc support to each respective supporting surface of the disc support.

5. A player as claimed in claim 1, characterized in that said given direction is a first direction of rotation of said member, and responsive to a second direction of rotation of said member opposite said first direction, said positioning device causes relative movement of said disc support with respect to said scanning device from said first to said second scanning device positions.

6. A player as claimed in claim 5, characterized in that said lifting mechanism comprises first and second parts which are coaxial with said support axis, said first part forming part of said disc support, and said second part being mounted for rotation about said support axis, one of said parts being said member; and means, including an inclined surface, for coupling said parts to one another for movement relative to each other along said inclined surface.

7. A player as claimed in claim 6, characterized in that one of said parts of the lifting mechanism is formed with a plurality of grooves corresponding to said plurality of supporting surfaces, each groove extending at least substantially parallel to the support axis; and the other of said parts comprises at least one coupling projection arranged to engage a respective groove during relative movement of the disc support with respect to the scanning device parallel to said support axis.

8. A player as claimed in claim 1, characterized in that said lifting mechanism comprises first and second parts which are coaxial with said support axis, said first part forming part of said disc support, and said second part being mounted for angular movement about said support axis responsive to movement of said member in said at least one direction, and means, including an inclined surface engaged by said second part, for causing movement of said second part parallel to said support axis responsive to said angular movement.

9. A player as claimed in claim 1, characterized in that said plurality of supporting surfaces of said disc support are equi-angularly spaced about said support axis, and the player comprises two said scanning devices and a movable subframe, said scanning devices being arranged at locations spaced angularly about said support axis such that the respective turntable axes are spaced angularly from each other a distance equal to an angular distance between two of said supporting surfaces of the disc support, at least the turntable of one of said scanning devices being rotatably mounted to said subframe.

10. A player as claimed in claim 1, comprising two said scanning devices each mounted on a respective subframe secured to a respective slide, said slides being movable along respective radial paths about said support axis, both respective slides being movable relative to the disc support and to one another to bring respective information discs to respective scanning positions.

11. A disc-record player comprising:

a housing, and a stationary frame accommodated in said housing, a scanning device for scanning a positioned information disc which is in a scanning position in said housing, said device comprising a turntable which is rotatable about a turntable axis and which has a supporting surface for supporting said positioned information disc in said scanning position, a disc support which has a plurality of supporting surfaces spaced around a support axis, adapted to support a corresponding plurality of information discs, means for mounting said disc support for rotation about said support axis in said stationary frame, and for retaining said disc support permanently inside said housing, a loading device, comprising: a drawer which is movable through an opening in the housing, and has a supporting surface for moving information discs into and out of the housing; and loading means for moving the respective supporting surfaces of the disc support and the drawer relative to each other in a direction parallel to said support axis, and a positioning device comprising a drive unit including a rotating member for positioning the scanning device and the disc support relative to one another about said support axis, to bring a selected information disc into said scanning position, relative rotation of said disc support being responsive to rotation of said member, characterized in that said positioning device comprises a lifting mechanism for moving the disc support relative to the frame, parallel to said support axis, responsive to rotation of said member, in a first direction of rotation of said member said disc support being moved in a first direction parallel to said support axis and in a given direction of rotation, and in a second direction of rotation of said member opposite said first direction, said disc support being moved in a second direction opposite said first direction parallel to said support axis.

12. A player as claimed in claim 11, characterized in that during movement in said first direction parallel to said support axis said disc support moves from a first position in which the supporting surfaces of the disc support lie in a plane below the supporting surfaces of the drawer and the turntable, to a second position in which the supporting surfaces of the disc support lie in a plane above the supporting surfaces of the drawer and the turntable.

13. A player as claimed in claim 12, characterized in that said disc support has a respective recess extending radially from the periphery of the disc support to each respective supporting surface of the disc support.

14. A player as claimed in claim 13, characterized in that said plurality of supporting surfaces of said disc support are equi-angularly spaced about said support axis, and the player comprises two said scanning devices and a movable subframe, said scanning devices being arranged at locations spaced angularly about said support axis such that the respective turntable axes are spaced angularly from each other a distance equal to an angular distance between two of said supporting surfaces of the disc support, at least the turntable of one of said scanning devices being rotatably mounted to said subframe.

15. A player as claimed in claim 12, characterized in that said given direction is a first direction of rotation of said member, responsive to rotation of said member in said first direction, said positioning device moves said disc support from said first position to said second position, and then rotates said disc support, and responsive to rotation of said member in a second direction opposite said first direction, said positioning device moves said disc support from said second position to said first position.

16. A player as claimed in claim 11, comprising a spindle fixed to said frame, characterized in that said lifting mechanism comprises first and second parts which are coaxial with said support axis, said first part forming part of said disc support, and said second part being mounted for rotation about said spindle, one of said parts being said member; and means, including an inclined surface, for coupling said parts to one another for movement relative to each other along said inclined surface.

17. A player as claimed in claim 16, characterized in that one of said parts of the lifting mechanism is formed with a plurality of grooves corresponding to said plurality of supporting surfaces, each groove extending at least substantially parallel to the support axis; and the other of said parts comprises at least one coupling projection arranged to engage a respective groove during movement of the disc support in said direction parallel to said support axis.

18. A disc-record player comprising:

a housing, and a stationary frame accommodated in said housing, a scanning device for scanning a positioned information disc which is in a scanning position in said housing, said device comprising a turntable which is rotatable about a turntable axis and which has a supporting surface for supporting said positioned information disc in said scanning position, a disc support which has a plurality of supporting surfaces spaced around a support axis, adapted to support a corresponding plurality of information discs, means for mounting said disc support for rotation about said support axis in said stationary frame, and for retaining said disc support permanently inside said housing, a loading device, comprising: a drawer which is movable through an opening in the housing, and has a supporting surface for moving information discs into and out of the housing; and loading means for moving the respective supporting surfaces of the disc support and the drawer relative to each other in a direction parallel to said support axis, and a positioning device comprising a drive unit including a rotating member for positioning the scanning device and the disc support relative to one another about said support axis, to bring a selected information disc into said scanning position, relative rotation of said disc support being responsive to rotation of said member, characterized in that the position device comprises a lifting mechanism for moving the scanning device parallel to said support axis, between a first scanning device position in which the disc support can be rotated by said positioning device free from interference with said scanning device, and a second scanning device position in which an information disc can be transferred between the supporting surface of the turntable and one of said supporting surfaces of the disc support, said lifting mechanism being responsive to rotation of said member.

19. A player as claimed in claim 18, characterized in that the scanning device comprises a subframe on which the turntable is arranged, and means for mounting said subframe for pivotable movement relative to the frame about a pivot axis which extends at least parallel to the turntable axis, and said lifting mechanism comprises means, responsive to pivoting movement of said subframe about said pivot axis, for moving said scanning device in a direction parallel to said turntable axis in order to move the scanning device between said first and second scanning device positions.

20. A player as claimed in claim 19, characterized in that the means for moving said scanning device comprises two inclined surfaces and two follower elements, each follower element engaging a respective inclined surface, relative pivoting movement of said inclined surfaces and follower elements moving the scanning device in said direction parallel to said turntable axis.

21. A player as claimed in claim 19, characterized in that said rotating member is fixed to said disc support.

22. A player as claimed in claim 19, characterized in that said positioning device comprises a unidirectional coupling arranged such that, responsive to rotation of said member in a first direction, said disc support moves in a given direction of rotation while the subframe is held in position; and responsive to rotation of said member in a second direction opposite said first direction, said subframe and said disc support are moved together in a direction opposite said given direction and said subframe is moved in a direction parallel to the turntable axis.

23. A player as claimed in claim 22, characterized in that the unidirectional coupling comprises a plurality of actuating projections arranged on the disc support, each projection corresponding to a respective one of said plurality of supporting surfaces of the disc support, and a pawl mechanism connected to the subframe and disposed to engage one of said projections.

24. A player as claimed in claim 22, characterized in that the drawer of the loading device comprises a tray which is provided with the supporting surface of the drawer, and said loading means comprises means for moving said tray at least in a direction transverse to the supporting surface of the drawer between a first tray position when the surface of the drawer is in a slid-out position, and a second tray position when the drawer is in a slid-in position; in said first tray position the supporting surface of the drawer being disposed in a plane above the supporting surfaces of the disc support; and in said second tray position the supporting surface of the drawer being disposed in a plane below the supporting surfaces of the disc support.

25. A player as claimed in claim 24, characterized in that said disc support has a respective recess extending radially from the periphery of the disc support to each respective supporting surface of the disc support.

* * * * *